(12) United States Patent
Saito et al.

(10) Patent No.: US 8,559,121 B2
(45) Date of Patent: Oct. 15, 2013

(54) SYSTEM, METHOD AND APPARATUS FOR SHINGLED MAGNETIC RECORDING IN DISK DRIVES

(75) Inventors: Kosuke Saito, Kanagawa (JP); Kazuaki Usui, Kanagawa (JP); Masaharu Kawamura, Kanagawa (JP)

(73) Assignee: HGST Netherlands B.V., Amsterdam (NL)

( * ) Notice: Subject to any disclaimer, the term of this patent is extended or adjusted under 35 U.S.C. 154(b) by 109 days.

(21) Appl. No.: 13/338,658

(22) Filed: Dec. 28, 2011

(65) Prior Publication Data

US 2013/0170061 A1 Jul. 4, 2013

(51) Int. Cl.
*G11B 27/02* (2006.01)

(52) U.S. Cl.
USPC ............................................. 360/13; 360/66

(58) Field of Classification Search
None
See application file for complete search history.

(56) References Cited

U.S. PATENT DOCUMENTS

| | | | |
|---|---|---|---|
| 6,185,063 | B1 | 2/2001 | Cameron |
| 6,967,810 | B2 | 11/2005 | Kasiraj et al. |
| 7,394,607 | B2 | 7/2008 | Ohno et al. |
| 7,440,221 | B2 | 10/2008 | Tsuchinaga et al. |
| 7,486,460 | B2 | 2/2009 | Tsuchinaga et al. |
| 7,965,465 | B2 | 6/2011 | Sanvido et al. |

*Primary Examiner* — Wayne Young
*Assistant Examiner* — Brian Butcher

(57) ABSTRACT

A method of targeted corruption of user data in a shingled magnetic recording disk includes identifying user data on a Track_N targeted for corruption; identifying a readback centerline of the Track_N; identifying a readback centerline of an adjacent track to Track_N; acquiring user data of the adjacent track; and rewriting the user data of the adjacent track with an offset write centerline to overwrite magnetic material at the readback centerlines of both Track_N and the adjacent track.

17 Claims, 4 Drawing Sheets

SYSTEM, METHOD AND APPARATUS FOR SHINGLED MAGNETIC RECORDING IN DISK DRIVES

BACKGROUND OF THE INVENTION

1. Field of the Disclosure

The present invention relates in general to storage media and, in particular, to a system, method and apparatus for shingled magnetic recording in disk drives.

2. Description of the Related Art

Disk drives such as magnetic or optical disk drives, read data from and write data to media disks. For example, hard disk drives having magnetic patterns on magnetic media have been used for decades to store digital data, and offer low cost, high recording capacity, and rapid data retrieval.

The magnetic material is made up of separate magnetic grains. The magnetic polarity within each grain is the same, e.g., each grain has for instance an upward or downward polarity in perpendicular recording. The recorded data bits include many of these separate grains. The read head is affected by the summation of the effects of the nearby grains as it passes through a data track. Nearby grains have a stronger magnetic effect than grains that are further away. In general, the magnetic flux diminishes by a factor of distance to the third power, so the magnetic grains directly below the read head element have the most profound effect on the readback signal.

The read head will always pick up some magnetic signal from adjacent tracks. This adjacent track interference (ATI noise) can be minimized by reading at the center of the data track such that the ATI noise is small in magnitude. If the read head is positioned too close to an adjacent track, then the adjacent track's magnetic bits provide a more significant portion of the readback signal (i.e., the "noise" becomes the dominant signal). There is a point where if the read head is too close to the adjacent track, the readback signal becomes unreliable to decode (e.g., jumbled or noisy). In these cases, the analog signal processing and error correction in the hard drive's read channel may not be able to separate the target track data from the adjacent track's data. Thus, improvements in magnetic recording continue to be of interest.

SUMMARY

Embodiments of a system, method and apparatus for shingled magnetic recording are disclosed. In one embodiment, a method of targeted corruption of user data in a shingled magnetic recording disk may comprise: identifying user data on a Track_N targeted for corruption; identifying a readback centerline of the Track_N; identifying a readback centerline of an adjacent track to Track_N; acquiring user data of the adjacent track; and rewriting the user data of the adjacent track with an offset write centerline to overwrite magnetic material at the readback centerlines of both Track_N and the adjacent track.

For embodiments with wider data tracks, the method may further comprise rewriting the user data of the adjacent track a second time at a different write center offset than said offset write centerline to more effectively overwrite the magnetic material at the readback centerlines of both Track_N and the adjacent track.

Another embodiment of a method of targeted corruption of user data in a shingled magnetic recording disk may comprise: identifying user data on a Track_N targeted for corruption; identifying a readback centerline of the Track_N; identifying readback centerlines of first and second adjacent tracks (e.g., Track_N−1 and Track_N+1) to Track_N; acquiring user data of the first and second adjacent tracks; rewriting the user data of the first adjacent track (Track_N−1 or, alternatively, Track_N+1); and rewriting the user data of the second adjacent track (Track_N+1 or, alternatively, Track_N−1) on free space (e.g., another vacant track). Together, these steps corrupt the magnetic material at the readback centerline of Track_N. These steps also may rewrite the user data of both the first adjacent track upon the magnetic material at the Track_N readback centerline, and the user data of Track_N+1 upon the magnetic material at the new data track.

Still another embodiment of method of targeted corruption of user data in a shingled magnetic recording disk may comprise: identifying user data on a Track_N targeted for corruption; identifying a readback centerline of the Track_N; identifying a readback centerline of an adjacent track to Track_N; and writing dummy data on the adjacent track with an offset write centerline to overwrite magnetic material at the readback centerlines of both Track_N and the adjacent track, and thus rewrite the user data of the adjacent track over the free space such as other vacant tracks.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
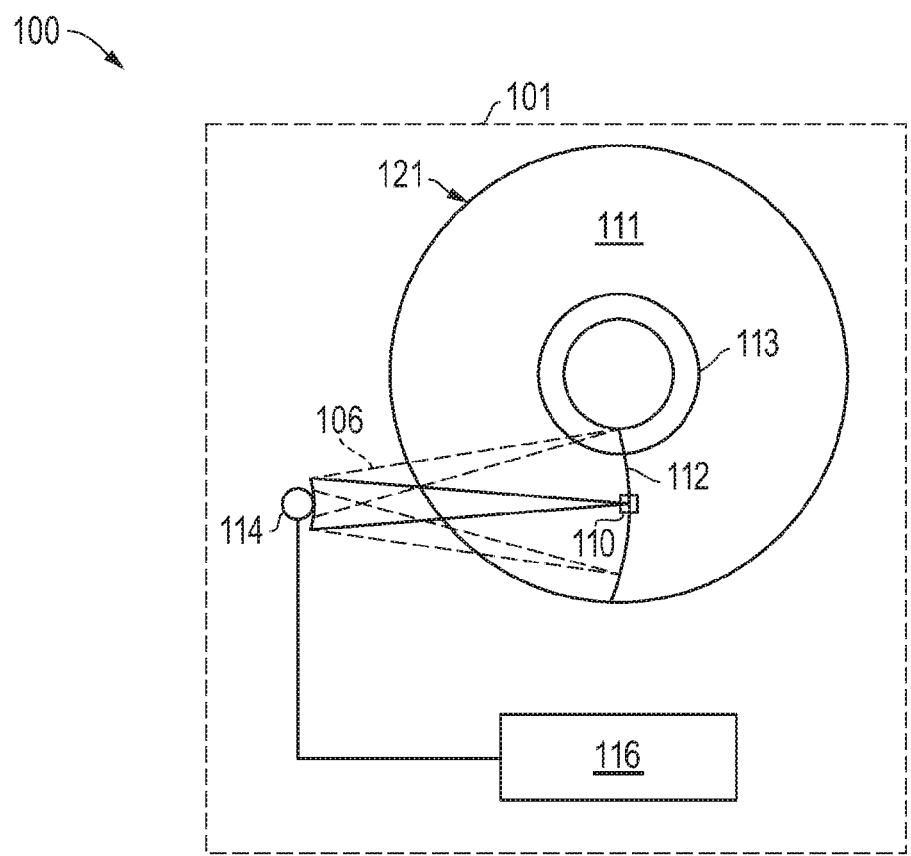
FIG. 1 is a schematic top view of an embodiment of a disk drive.

Embodiments of a system, method and apparatus for shingled magnetic recording in disk drives are disclosed. FIG. 1 depicts a hard disk drive assembly 100 comprising a housing or enclosure 101 with one or more media disks 111 rotatably mounted thereto. The disk 111 comprises magnetic recording media rotated at high speeds by a spindle motor (not shown) during operation. Concentric magnetic data tracks 113 are formed on either or both of the disk surfaces to receive and store information.

Embodiments of a read/write slider 110 may be moved across the disk surface by an actuator assembly 106, allowing the slider 110 to read and/or write magnetic data to a particular track 113. The actuator assembly 106 may pivot on a pivot 114. The actuator assembly 106 may form part of a closed loop feedback system, known as servo control, which dynamically positions the read/write slider 110 to compensate for thermal expansion of the magnetic recording media 111 as well as vibrations and other disturbances or irregularities. Also involved in the servo control system is a complex computational algorithm executed by a microprocessor, digital signal processor, or analog signal processor 116 that receives data address information from a computer, converts it to a location on the disk 111, and moves the read/write slider 110 accordingly.

In some embodiments of hard disk drive systems, read/write heads 110 periodically reference servo patterns recorded on the disk to ensure accurate slider 110 positioning. Servo patterns may be used to ensure a read/write slider 110 follows a particular track 113 accurately, and to control and monitor transition of the slider 110 from one track to another. Upon referencing a servo pattern, the read/write slider 110 obtains head position information that enables the control circuitry 116 to subsequently realign the slider 110 to correct any detected error.

Servo patterns or servo sectors may be contained in engineered servo sections 112 that are embedded within a plurality of data tracks 113 to allow frequent sampling of the servo patterns for improved disk drive performance, in some embodiments. In a typical magnetic recording media 111, embedded servo sections 112 may extend substantially radially from the center of the magnetic recording media 111, like spokes from the center of a wheel. Unlike spokes however, servo sections 112 form a subtle, arc-shaped path calibrated to substantially match the range of motion of the read/write slider 110.

Figure 2:
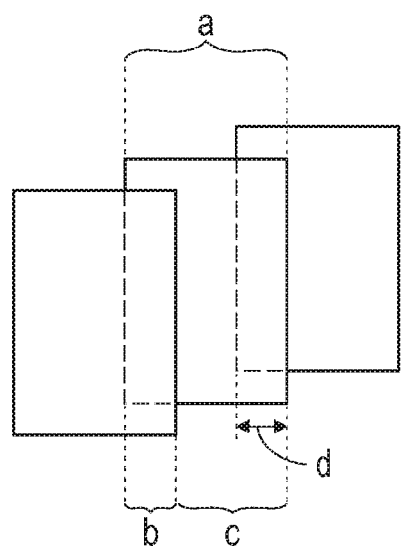
FIG. 2 is a diagram of an embodiment of shingled tracks.

Regarding the term "track" (FIG. 2), there may be defined an originally written data track "a" that is as wide as the write head; an overlapped area "b" that is corrupted or erased with the next sequential track write; a remaining area "c" that retains the data for the narrow read element readback with an optimal centerline of the remaining area for readbacks; and an off-center area "d" between the final remaining areas that is not reliable for readback.

Figure 3:
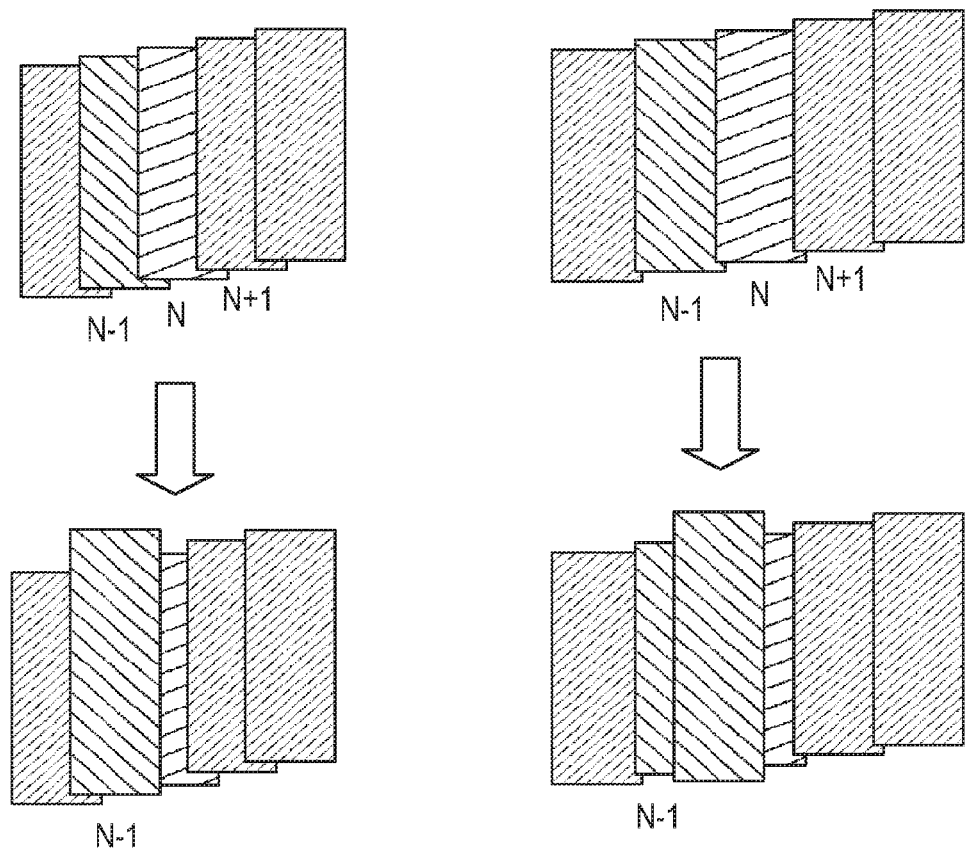
FIGS. 3-5 are schematic views of embodiments of methods of rewriting shingled tracks in a disk drive.

In other embodiments (FIG. 3), a method of targeted corruption of user data in a shingled magnetic recording disk may comprise: identifying user data on a Track_N targeted for corruption; identifying a readback centerline of the Track_N; identifying a readback centerline of an adjacent track to Track_N; acquiring user data of the adjacent track; and rewriting the user data of the adjacent track with an offset write centerline to overwrite magnetic material at the readback centerlines of both Track_N and the adjacent track.

In some versions, the adjacent track is Track_N+1, and in other versions the adjacent track is Track_N−1. The user data on Track_N targeted for corruption may be completely erased rather than merely corrupted so as to make it unreadable.

Figure 4:
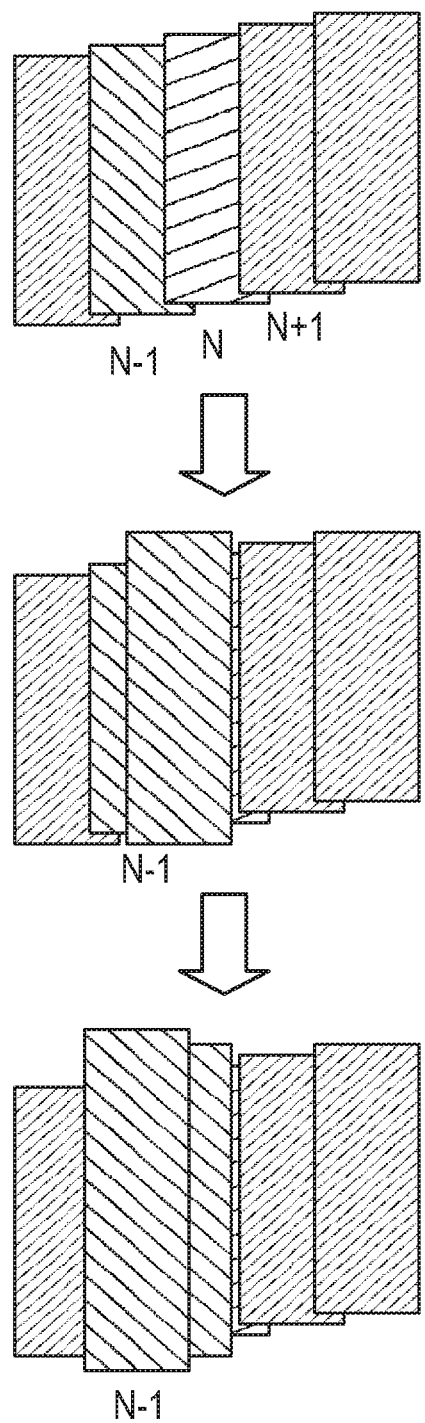

The method may still further comprise rewriting the user data of the adjacent track a second time at a different write center offset than said offset write centerline as shown in FIG. 4.

Figure 5:
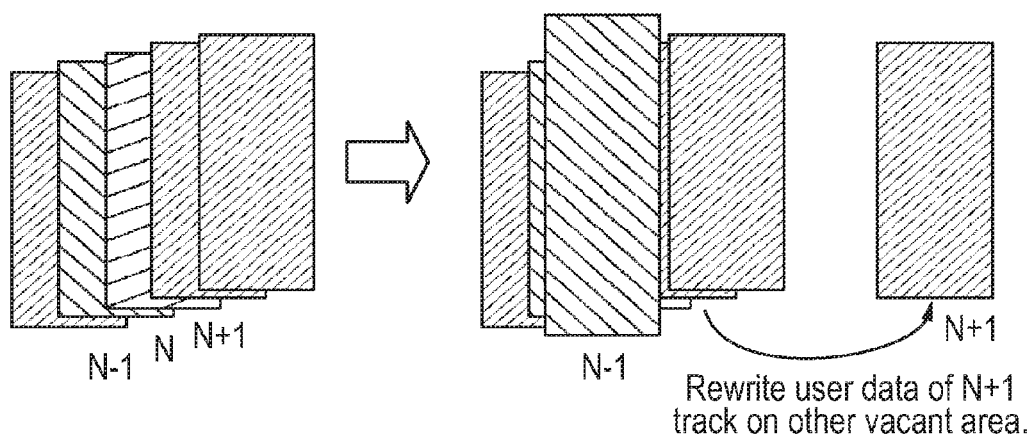

Another embodiment (FIG. 5) of a method of targeted corruption of user data in a shingled magnetic recording disk may comprise: identifying user data on a Track_N targeted for corruption; identifying a readback centerline of the Track_N; identifying readback centerlines of first and second adjacent tracks (e.g., Track_N−1 and Track_N+1) to Track_N; acquiring user data of the first and second adjacent tracks; rewriting the user data of the first adjacent track (Track_N−1 or Track_N+1). Together, these steps corrupt the magnetic material at the readback centerline of Track_N. In addition, these steps may rewrite the user data of the second adjacent track (Track_N−1 or Track_N+1 on free space, such as one or more other vacant tracks.

The number of tracks which are rewritten on free space may be changed as necessary. The data pattern which is written on Track_N may be dummy data. For example, if the write width of the head is five times larger than the track width, dummy data can be written on Track_N and the user data of Track_N−2, N−1, N+1, N+2 can be rewritten on free space. Again, the user data on Track_N may be targeted for partial corruption or completely erased.

Another embodiment of method of targeted corruption of user data in a shingled magnetic recording disk may comprise: identifying a readback centerline of the Track_N; identifying a readback centerline of an adjacent track to Track_N; and writing dummy data on the adjacent track with an offset write centerline to overwrite magnetic material at the readback centerlines of both Track_N and the adjacent track, and rewrite the user data of the adjacent track on free space (another vacant track). Again, the adjacent track may be Track_N+1 or Track_N−1.

In some embodiments, not all tracks are written in a single direction. The tracks may be subdivided into sets of shingled tracks, for example. Not all tracks are necessarily shingled, and not all tracks are necessarily shingled in the same direction. In other examples, a shingled hard disk drive may have a non-shingled area on the disk for normal random writes. The disk also may have small guard band areas between shingled areas. In addition, the last track of each set of shingled tracks may not be partially overlapped.

Thus, the entire disk surface is not necessarily shingled nor necessarily in in same direction. For example, with asymmetrical write heads, the geometry of the write head affects the shingle write direction. Some write heads write from the outer diameter (OD) of the disk to the inner diameter (ID) of the disk, while other write heads write from ID to OD. In other embodiments, the top surface of a disk may be written from ID to OD, while the bottom surface may be written from OD to ID. With symmetrical write heads, the write head may shingle data in both directions. Again, all of these tracks are not necessarily written in a single direction. Some disks may have more than one shingle writing direction, and may be written from ID to OD.

In some embodiments, data may be written to a track with a write head that is offset from the normal track center. Thus, each track has a 'normal' track center, but it may be written or rewritten to while the write head is on a different track center. In some examples, a single rewrite of a track adjacent to a Track_N center corrupts or erases the data on Track_N, but also refreshes the adjacent track. For example, this may be the case for 'final' data tracks having tracks widths that are about one-half of the width of the write head. In other cases, the refresh/erase writing may be done on a new track center, such that Track_N is corrupted or erased, and data bits for the adjacent track are clean.

In embodiments where the shingling of tracks is more substantial, such as where the final SMR tracks are about one-third or less of the write head width, rewrite may comprise two or more full track writes. For example, to corrupt or erase the data on Track_N, rewrite of the two adjacent tracks (e.g., Track_N−1 and Track_N+1) may be required.

In general, conventional HDD tracks are generally considered to be "written" in the on-track direction around the circumference of concentric tracks. However, in SMR the shingled tracks are usually described as "propagating" or "shingled" in a radial direction. When adjacent track data is rewritten the data is effectively "refreshed."

In some embodiments, a method of corrupting or erasing data in a disk drive comprises: providing a disk drive with tracks for data, and at least a portion of the tracks is written in a shingled configuration, such that substantially all of said at least a portion of the tracks are at least partially overlapped by at least one other track, and data for a single one of said at least a portion of the tracks cannot be randomly written without affecting the data on an adjacent track because of the overlap of the tracks; writing data to a Track_N; writing data to a track adjacent to and overlapping with Track_N; and corrupting the data on Track_N by rewriting the data on the adjacent track, such that the data on Track_N is at least partially erased and not readable, and the data on the adjacent track is refreshed.

Embodiments of Track_N may have a Track_N center, and the adjacent track may have an adjacent track center that is offset from the Track_N center, and corrupting the data on Track_N may comprise rewriting the data on the adjacent track along the adjacent track center. In an alternate embodiment, corrupting the data on Track_N may comprise writing the adjacent track data on Track_N along the adjacent track center, or along the Track_N center. At least a portion of the tracks may have track widths that are about one-half of a width of a write head of the disk drive, and a single rewrite of the adjacent track on a center of the adjacent track may corrupt the data on Track_N and refresh the data on the adjacent track.

Still other embodiments may have at least a portion of the tracks that are shingled such that they are overlapped by at least two other tracks, and corrupting the data on Track_N may comprise rewriting all of said at least two other tracks. Track_N may be overlapped by Track_N−1 and Track N+1, and corrupting the data on Track_N may comprise rewriting the respective data on Track_N−1 and Track_N+1.

Embodiments may comprise only erasing the data from Track_N such that Track_N does not have the data of the adjacent track. Erasing data may comprise also writing the data of the adjacent track on Track_N. Erasing data may further comprise twice rewriting the data on the adjacent track.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of targeted corruption of user data in a shingled magnetic recording disk, comprising:
    a. identifying user data on a Track_N targeted for corruption;
    b. identifying a readback centerline of the Track_N;
    c. identifying a readback centerline of an adjacent track to Track_N;
    d. acquiring user data of the adjacent track; and
    e. rewriting the user data of the adjacent track with an offset write centerline to overwrite magnetic material at the readback centerlines of both Track_N and the adjacent track.

2. The method of claim 1, wherein the adjacent track is Track_N+1.

3. The method of claim 1, wherein the adjacent track is Track_N−1.

4. The method of claim 1, wherein the user data on Track_N targeted for corruption is completely erased.

5. The method of claim 1, further comprising rewriting the user data of the adjacent track a second time at a different write center offset than said offset write centerline.

6. The method of claim 2, further comprising rewriting the user data of the adjacent track a second time at a different write center offset than said offset write centerline.

7. The method of claim 3, further comprising rewriting the user data of the adjacent track a second time at a different write center offset than said offset write centerline.

8. A method of targeted corruption of user data in a shingled magnetic recording disk, comprising:
    a. identifying user data on a Track_N targeted for corruption;
    b. identifying a readback centerline of the Track_N;
    c. identifying readback centerlines of first and second adjacent tracks to Track_N;
    d. acquiring user data of the first and second adjacent tracks;
    e. rewriting the user data of the first adjacent track; and
    f. rewriting the user data of the second adjacent track on free space, corrupting magnetic material at the readback centerline of Track_N and rewriting the user data of both the first adjacent track at the readback centerline of Track N, and rewriting the user data of the second adjacent track at a new data track.

9. The method of claim 8, wherein the second adjacent track is rewritten before the first adjacent track is rewritten.

10. The method of claim 8, wherein the first adjacent track is rewritten before the second adjacent track is rewritten.

11. The method of claim 8, wherein the first adjacent track is Track_N+1, and the second adjacent track is Track_N−1.

12. The method of claim 8, wherein the first adjacent track is Track_N−1, and the second adjacent track is Track_N+1.

13. The method of claim 8, wherein the user data on Track_N targeted for corruption is completely erased.

14. A method of targeted corruption of user data in a shingled magnetic recording disk, comprising:
   a. identifying a readback centerline for a Track_N;
   b. identifying a readback centerline of an adjacent track to Track_N; and
   c. writing dummy data on the adjacent track with an offset write centerline to overwrite magnetic material at the readback centerlines of both Track_N and the adjacent track, and rewriting user data of the adjacent track on free space.

15. The method of claim 14, wherein the adjacent track is Track_N+1.

16. The method of claim 14, wherein the adjacent track is Track_N−1.

17. The method of claim 14, wherein the user data on Track_N targeted for corruption is completely erased.

* * * * *